(12) United States Patent
Guo et al.

(10) Patent No.: US 9,720,076 B2
(45) Date of Patent: Aug. 1, 2017

(54) CALIBRATION CIRCUITRY AND METHOD FOR A TIME OF FLIGHT IMAGING SYSTEM

(71) Applicant: OMNIVISION TECHNOLOGIES, INC., Santa Clara, CA (US)

(72) Inventors: Jian Guo, Milpitas, CA (US); Rui Wang, San Jose, CA (US); Tiejun Dai, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 454 days.

(21) Appl. No.: 14/473,803

(22) Filed: Aug. 29, 2014

(65) Prior Publication Data

US 2016/0061941 A1    Mar. 3, 2016

(51) Int. Cl.
*G01S 7/497*   (2006.01)
*G01S 17/89*   (2006.01)
*G01S 7/483*   (2006.01)
*G06F 3/01*    (2006.01)

(52) U.S. Cl.
CPC .............. *G01S 7/497* (2013.01); *G01S 7/483* (2013.01); *G01S 17/89* (2013.01); *G06F 3/017* (2013.01)

(58) Field of Classification Search
CPC . H01L 27/14612; G01S 17/89; G01S 7/4865; G01S 7/4863; G01S 17/10
See application file for complete search history.

(56) References Cited

U.S. PATENT DOCUMENTS

| 7,433,029 B1 | 10/2008 | Hsu |
| 7,719,662 B2 | 5/2010 | Bamji et al. |
| 2009/0237640 A1* | 9/2009 | Krikorian ............ G01S 7/4811 356/5.01 |
| 2010/0303299 A1 | 12/2010 | Cho et al. |
| 2011/0090317 A1 | 4/2011 | Su et al. |
| 2013/0181119 A1* | 7/2013 | Bikumandla ..... H01L 27/14612 250/214.1 |

FOREIGN PATENT DOCUMENTS

| TW | 201115183 A | 5/2011 |
| TW | 201205044 A | 2/2012 |

OTHER PUBLICATIONS

TW Patent Application No. 104117832—Taiwanese Search Report, dated May 30, 2016, with English Translation, 2 pages.

* cited by examiner

*Primary Examiner* — Luke Ratcliffe

(74) *Attorney, Agent, or Firm* — Christensen O'Connor Johnson Kindness PLLC

(57) ABSTRACT

A time of flight imaging system includes a light source coupled to emit light pulses to an object in response a light source modulation signal generated in response to a reference modulation signal. Each pixel cell of a time of flight pixel cell array is coupled to sense light pulses reflected from the object in response a pixel modulation signal. A programmable pixel delay line circuit is coupled to generate the pixel modulation signal with a variable pixel delay programmed in response to a pixel programming signal. A control circuit is coupled to receive pixel information from the time of flight pixel array representative of the sensed reflected light pulses. The control circuit is coupled to vary the pixel programming signal during a calibration mode to synchronize the light pulses emitted from the light source with the pulses of the pixel modulation signal.

20 Claims, 4 Drawing Sheets

CALIBRATION CIRCUITRY AND METHOD FOR A TIME OF FLIGHT IMAGING SYSTEM

BACKGROUND INFORMATION

Field of the Disclosure

This invention is related to image sensors. In particular, embodiments of the present invention are related to three dimensional image sensors.

Background

Interest in three dimensional (3D) cameras is increasing as the popularity of 3D applications continues to grow in applications such as multimedia, gesture based human-machine interfaces, automobiles, and the like. A typical passive way to create 3D images is to use multiple cameras to capture stereo or multiple images. Using the stereo images, objects in the images can be triangulated to create the 3D image. One disadvantage with this triangulation technique is that it is difficult to create 3D images using small devices because there must be a minimum separation distance between each camera in order to create the three dimensional images. In addition, this technique is complex and therefore requires significant computer processing power in order to create the 3D images in real time.

For applications that require the acquisition of 3D images in real time, active depth imaging systems based on the optical time of flight measurement are sometimes utilized. Time of flight imaging systems typically employ a light source that directs light at an object, a sensor that detects the light that is reflected from the object, and a processing unit that calculates the distance to the object based on the round trip time that it takes for light to travel to and from an object. In typical time of flight sensors, photodiodes are often used because of the high transfer efficiency from the photo detection regions to the sensing nodes. Separate circuitry is coupled to the photodiodes in each pixel cell to detect and measure the light that is reflected from the object.

Existing 3D complementary metal oxide semiconductor (CMOS) imagers generally utilize time of flight imaging systems to extract distance information of various imaging objects using charge modulation. In order to achieve high depth resolution, expensive laser trigger systems with sharp rise/fall edges and extensive post-signal processing are often utilized to compensate for the intrinsic delays in the electronic systems.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
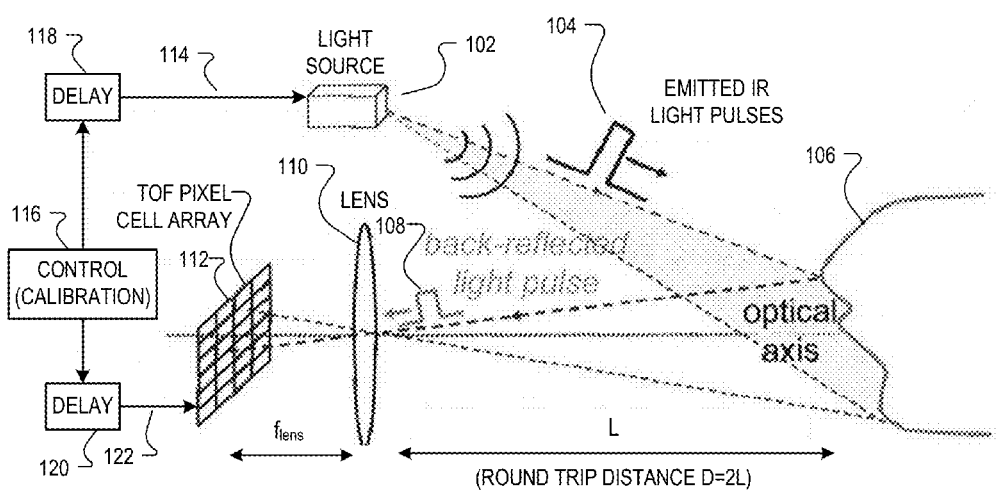
FIG. 1 is a block diagram that shows one example of a time of flight imaging system including control circuitry with a calibration mode in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Methods and circuitry for calibrating time of flight pixel cells in a time of flight imaging system are disclosed. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. For example, the term "or" is used in the inclusive sense (e.g., as in "and/or") unless the context clearly indicates otherwise.

As will be shown, examples of fast and accurate calibration circuitry and methods are disclosed that provide a low-cost CMOS-based 3D imaging systems with light sources such as LEDs as the optical trigger sources are disclosed. Examples of the disclosed calibration circuitry and techniques compensate for delays in the entire system from LEDs to electronic shutter circuits. In various examples, a time of flight imaging system includes a calibration architecture that utilizes on-chip programmable delay lines to carry out flexible and highly efficient calibration of the delay differences between the light source and the image sensor. In various examples, the disclosed calibration circuitry and techniques can achieve sub-nanosecond accuracy with minimum hardware cost and power consumption in accordance with the teachings of the present invention.

To illustrate, FIG. 1 is a block diagram that shows one example of a time of flight imaging system 100 including calibration circuitry in accordance with the teachings of the present invention. As shown, time of flight imaging system 100 includes a light source 102 that emits light pulses, which are illustrated as emitted light 104 in FIG. 1. As shown, emitted light 104 is directed to an object 106. In one example, emitted light 104 includes pulses of infrared (IR) light. It is appreciated that in other examples, emitted light 104 may have wavelengths other than infrared, such as for example visible light, near-infrared light, etc., in accordance with the teachings of the present invention. Emitted light 104 is then reflected back from an object 106, which is shown as back reflected light 108 in FIG. 1. As shown, reflected light 108 is directed from object 106 through a lens 110 and is then focused onto a time of flight pixel cell array 112. In one example, time of flight pixel cell array 112 includes a plurality of time of flight pixel cells arranged in a two dimensional array.

As shown in the depicted example, light source 102 is coupled to emit light 104 in response to a light source modulation signal 114 received from a first delay circuit 118, which is coupled to control circuitry 116. Time of flight pixel cell array 112 is coupled to sense the back reflected light 108 in response to a pixel modulation signal 122 received from a second delay circuit 120, which is also coupled to control circuitry 116. As will be discussed in greater detail below, control circuitry 116 includes a calibration mode, which utilizes the first and second delay circuits 118 and 120 to synchronize the light source modulation signal 114 and pixel modulation signal 122 in accordance with the teachings of the present invention.

In the example depicted in FIG. 1, it is noted that time of flight pixel cell array 112 is positioned at a focal length $f_{lens}$ from lens 110. As shown in the example, the light source 102 and the lens 110 are positioned at a distance L from the object. In one example, it is noted that lens 110 may be implemented with a plurality of microlenses that are integrated into time of flight pixel cell array 112. It is appreciated of course the FIG. 1 is not illustrated to scale and that in one example, the focal length $f_{lens}$ is substantially less than the distance L between lens 110 and object 106. Therefore, it is appreciated that for the purposes of this disclosure, the distance L and the distance L+focal length $f_{lens}$ are substantially equal for purposes of time of flight measurements in accordance with the teachings of the present invention. In addition, it is also appreciated that for the purposes of this disclosure, the distance between the light source 102 and the object 106, and the distance between the object 106 and the lens 110, are also both substantially equal to L for purposes of time of flight measurements in accordance with the teachings of the present invention. Accordingly, the distance between the light source 102 and the object 106 (and/or the distance between the object 106 and the lens 110) is equal to half of the round trip distance, e.g., D, which is therefore equal to 2×L. In other words, it is assumed that the distance L from light source 102 to the object 106, plus the distance L back from the object 106 to the lens 110, is equal to the round trip distance D (or 2×L) in accordance with the teachings of the present invention.

In the depicted example, there is a delay time between the emission of a light pulse of emitted light 104 and the receipt of that light pulse in reflected light 108, which is caused by the amount of time that it takes for the light pulse to travel the distance L from light source 102 to object 106, and then the additional time it takes for the corresponding reflected light pulse 108 to travel the distance L back from object 106 to pixel cell array 112. The delay time between emitted light 104 and reflected light 108 represents the time of flight for the light pulses to make the round trip between the light source 102 and object 106. Once the time of flight (i.e., TOF) is known, the distance L from light source 102 to object 106 can be determined using the following relationships in Equations 1 and 2 below:

$$TOF = \frac{2 \times L}{c} \quad (1)$$

$$L = \frac{T_{TOF} \times c}{2} \quad (2)$$

where c is the speed of light, which is approximately equal to 3×10⁸ m/s, and TOF is the amount of time that it takes for the light pulse to travel to and from the object as shown in FIG. 1.

Figure 2:
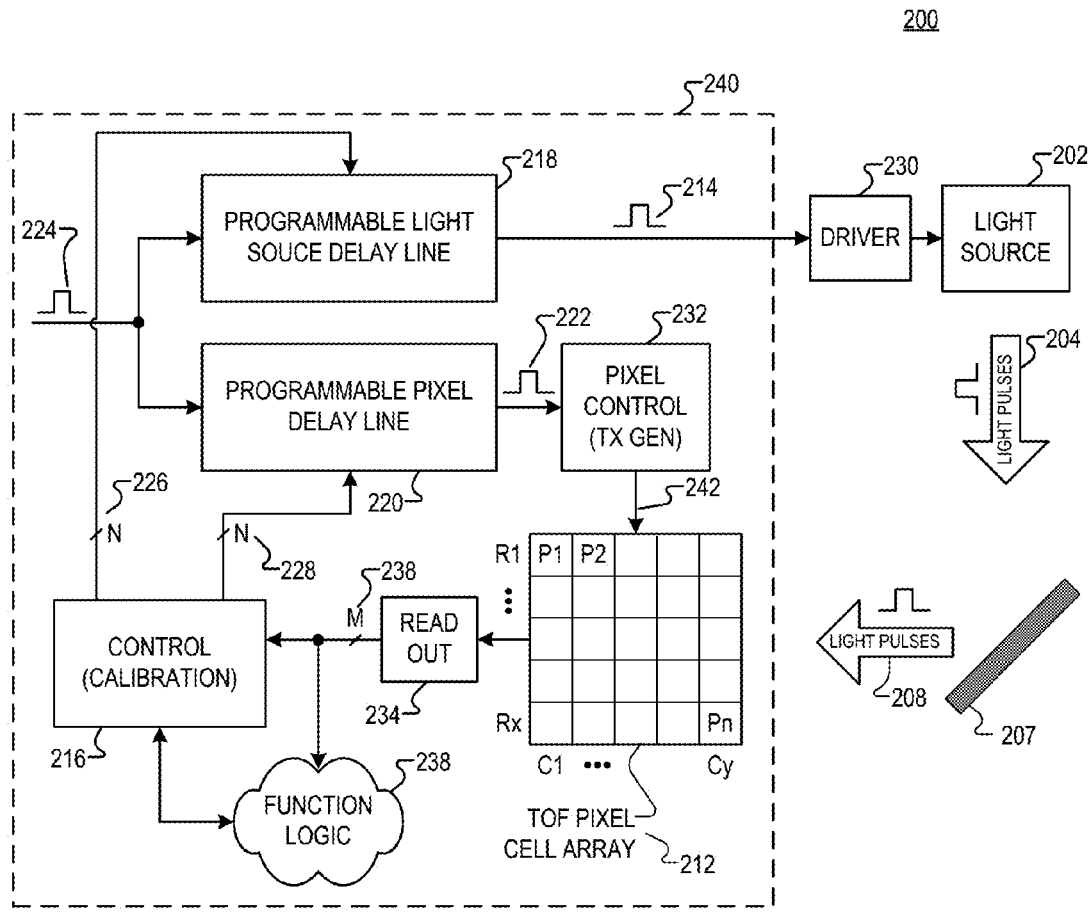
FIG. 2 is a block diagram that illustrates another example of a time of flight imaging system including control circuitry in increased detail during calibration in accordance with the teachings of the present invention.

FIG. 2 is a block diagram that illustrates another example with increased detail of a time of flight imaging system 200 including control circuitry during calibration in accordance with the teachings of the present invention. In the example depicted in FIG. 2, a chip 240 includes a control circuit 216 with a calibration mode that utilizes two programmable delay line circuits 218 and 220 to provide accurate synchronization between the actual light pulses 204 that are emitted from the light source 202 and the charge modulation pulses in pixel modulation signal 222 that are used to control the time of flight pixel array 212 to sense the reflected light pulses 208 that are incident on the time of flight pixel array 212 in accordance with the teachings of the present invention.

In particular, as shown in the depicted example, during calibration of time of flight imaging system 200, a calibration reflector 207 is positioned in front of light source 202 and time of flight pixel cell array 212. As a result, the light pulses 204 are reflected from calibration reflector 207 as reflected light pulses 208 to time of flight pixel array 212. In the illustrated example, the calibration reflector 207 is positioned at a relatively close distance (e.g., around 0.1 meters) from light source 202 and time of flight pixel cell array 212 during calibration. As a result, the optical signal of the reflected light pulses 208 incident on time of flight pixel cell array 212 is relatively strong due to the close proximity to calibration reflector 207.

In the example illustrated in FIG. 2, time of flight pixel cell array 212 is a two dimensional (2D) array of time of flight pixel cells (e.g., pixel cells P1, P2 . . . , Pn). As illustrated, each pixel cell P1, P2 . . . , Pn is arranged into a row (e.g., rows R1 to Rx) and a column (e.g., column C1 to Cy) to sense reflected light pulses 208 that are reflected back from the calibration reflector 207 in response to respective pulses of a pixel modulation signal 222 generated by programmable pixel delay line circuit 220.

As shown in the example, programmable pixel delay line circuit 220 is coupled to generate the pixel modulation signal 222 by delaying the reference modulation signal 224 according to a pixel programming signal 228, which is generated by control circuitry 216. As will be discussed in greater detail below, programmable pixel delay line circuit 220 is coupled to provide a variable pixel delay, which is programmed in response to pixel programming signal 228 to synchronize the light pulses 204 that are emitted from the light source 202 and the pulses in pixel modulation signal 222 that are used to control the time of flight pixel array 212 to sense the reflected light pulses 208 in accordance with the teachings of the present invention. In one example, pixel control circuitry 232 is coupled to receive pixel modulation signal 222 to generate control signals 242, which are coupled to control the pixel cells included in the time of flight pixel cell array 212 to sense the reflected light pulses 208 in response to pulses of the pixel modulation signal 222.

In the example depicted in FIG. 2, light source 202 is coupled to emit light pulses 204 to calibration reflector 207 in response to respective pulses of a light source modulation signal 214, which is coupled to be received from a programmable light source delay line circuit 218 through a driver circuit 230. As shown, a programmable light source delay line circuit 218 is coupled to generate the light source modulation signal 214 by delaying the reference modulation signal 224 according to a light source programming signal 226, which is coupled to be received from control circuit 216. In one example, programmable light source delay line circuit 218 is capable of providing a variable pixel delay, which is programmed in response to a light source programming signal 226.

In one example, control circuit 216 sets light source programming signal 226 to a fixed intermediate value and then varies the pixel programming signal 228 to synchronize the light pulses 204 that are emitted from the light source 202 and the pulses in pixel modulation signal 222 that are used to control the time of flight pixel array 212 in accordance with the teachings of the present invention. In particular, control circuit 116 is coupled to receive pixel information 238 from the time of flight pixel array 212, which is representative of the reflected light pulses 208 that are observed by the time of flight pixel array 212.

In operation, the control circuit 216 is coupled to vary the pixel programming signal 228 during a calibration mode in response to pixel information 238 received from the time of flight pixel array 212 to synchronize the light pulses 208 emitted from the light source 202 with the pulses of the pixel modulation signal 222 in accordance with the teachings of the present invention.

In the depicted example, pixel programming signal 228 and light source programming signal 226 are both N bit digital signals. For instance, in one example, N=8, and pixel programming signal 228 and light source programming signal 226 are therefore both 8 bit digital signals.

In the illustrated example, control circuit 216 is coupled to receive the pixel information 238 from the time of flight pixel array 212 through read out circuitry 234. For instance, in one example, the pixel cells P1, P2, . . . Pn in time of flight pixel cell array 212 are read out by read out circuitry 232 through bitlines. Read out circuitry 234 may also include amplifiers to further amplify the signals received through bitlines.

In one example, the pixel information 238 output by read out circuitry 234 may be an M bit digital signal. For instance, in one example, M=8, and pixel information is therefore a 10 bit digital signal generated by an analog to digital converter included in read out circuitry 234. In the depicted example, the pixel information 238 read out from the time of flight pixel array 212 is representative of an amount of charge Q photogenerated in the pixel cells in response to the reflected light pulses 208 that are sensed by the time of flight pixel array 212 in accordance with the teachings of the present invention.

In various examples, the pixel information 238 may be read out after a plurality of reflected light pulses 208 are sensed by time of flight pixel array 212. For instance, in one example, fifteen (15) reflected light pulses 208 are sensed by the time of flight pixel cell array 212 prior to each read out of pixel information 238 by read out circuitry 234. By sensing a plurality of reflected light pulses 208 before each read out, additional charge Q is allowed to accumulate in the pixel cells of time of flight pixel cell array 212, which improves the signal to noise ratio in pixel information 238.

In various examples, the pixel information 238 read out from time of flight pixel cell array 212 may be an averaged value that is determined based on readings from two opposite edges of the time of flight pixel cell array 212. For instance, in one example, the first row (e.g., row R1) and the last row (e.g., row Rx) are read out. The average charge for the first row (e.g., Q1) is computed and stored, and the average charge for the second row (e.g., Q2) is computed and stored. The purpose for this is to average out the top to bottom offset across the time of flight pixel cell array 212. The average for the read out may then be determined by computing the average of Q1 and Q2.

In one example, the information read out by read out circuitry 234 may then also be transferred to function logic 238. In one example, function logic 238 may determine the time of flight and distance information for each pixel cell. In one example, function logic 238 may also store the time of flight information and/or even manipulate the time of flight information (e.g., crop, rotate, adjust for background noise, or the like). In one example, read out circuitry 234 may read out an entire row of time of flight information at a time along the bitlines, or in another example may read out the time of flight information using a variety of other techniques (not illustrated), such as a serial readout or a full parallel readout of all pixel cells simultaneously.

In one example, control circuitry 216 is further coupled to time of flight pixel cell array 212 to control the operation of time of flight pixel cell array 212, as well as synchronize the operation of time of flight pixel cell array 212 with light source 202 as discussed above. It is noted that in other examples, control circuit 216 may set the pixel programming signal 228 to a fixed intermediate value and then vary the light source programming signal 226, or vary both the pixel programming signal 228 and the light source programming signal 226, to synchronize the light pulses 204 that are emitted from the light source 202 and the charge modulation pulses in pixel modulation signal 222 that are used to control the time of flight pixel array 212 in accordance with the teachings of the present invention.

Figure 3:
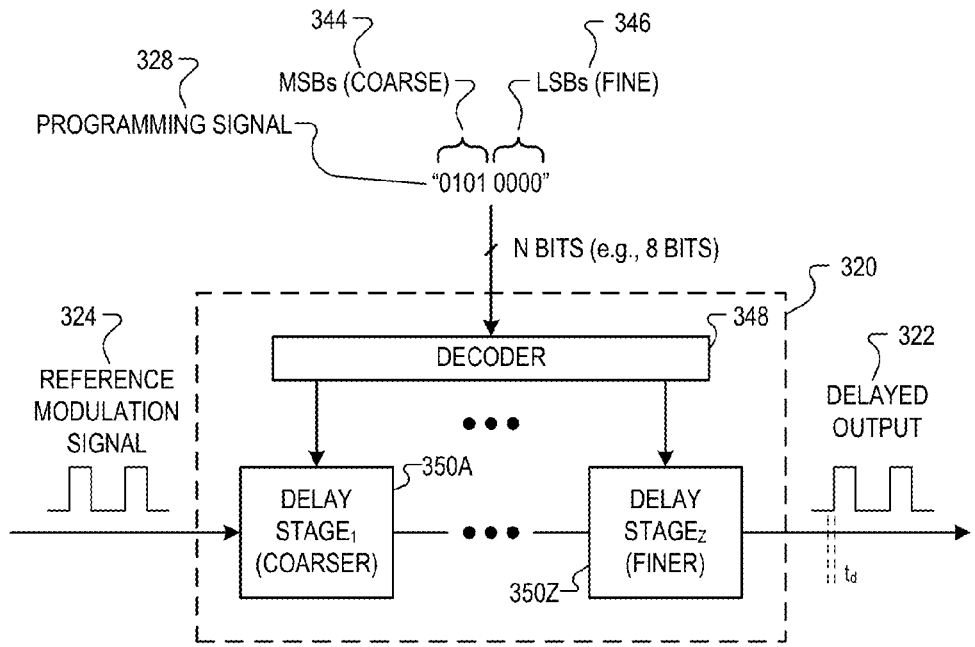
FIG. 3 is a block diagram that illustrates an example of a programmable delay circuit in accordance with the teachings of the present invention.

FIG. 3 is a block diagram that illustrates an example of a programmable delay circuit 320 in accordance with the teachings of the present invention. It is appreciated that programmable delay circuit 320 of FIG. 3 may be one example of first delay circuit 118 and/or second delay circuit 120 of FIG. 1, and/or of programmable light source delay line circuit 218 and/or programmable pixel delay line circuit 220 of FIG. 2, and that similarly named and numbered elements referenced below are therefore coupled and function similar to as described above. As shown in the depicted example, programmable delay circuit 320 of FIG. 3 is coupled to receive a reference modulation signal 324, and delay the reference modulation signal 324 by a variable delay $t_d$ in response to a programming signal 328 to generate a delayed output signal 322.

In the example, the programming signal 328 is an n bit digital signal, which is coupled to provide a variable delay $t_d$ during a calibration mode. In one example, the calibration mode may be divided into a plurality of portions, including for example a first portion and a second portion. For instance, during the first portion, coarse adjustments may be made to the programming signal 328 to quickly scan a large coarse range of delay values to quickly synchronize the light pulses 203 emitted from the light source 202 with the pulses of the pixel modulation signal 222 in accordance with the teachings of the present invention.

In one example, the most significant bits (MSBs) 344 of the programming signal 328 are swept through during a first portion (e.g., a coarse portion) of the calibration in accordance with the teachings of the present invention. Thus, in an example in which programming signal 328 is an 8 bit digital signal, the most significant byte (i.e., the upper 4 bits) is incremented through a coarse range when sweeping through the coarse portion of the calibration. For instance, in one example, the MSBs 344 of programming signal 328 are incremented from a value of binary 0000 to binary 1010 when sweeping through the coarse portion of the calibration in accordance with the teachings of the present invention. In the example, the lower byte (i.e., the lower 4 bits) is not changed during the coarse sweep.

During the second portion (e.g., a fine portion) of the calibration, fine adjustments may be made to the programming signal 328 to narrowly scan a fine range of delay values at higher resolution to more precisely synchronize the light pulses 204 emitted from the light source 202 with the pulses of the pixel modulation signal 222 in accordance with the teachings of the present invention.

In one example, the least significant bits (LSBs) 346 of the programming signal 328 are swept through during a fine portion of the calibration in accordance with the teachings of the present invention. Thus, in the example in which programming signal 328 is an 8 bit digital signal, the least significant byte (i.e., the lower 4 bits) is incremented through a fine range when sweeping through the fine portion of the calibration. For instance, in one example, the LSBs 346 of programming signal 328 are incremented from a value of binary 0000 to binary 1010 when sweeping through the fine portion of the calibration in accordance with the teachings of the present invention. In the example, the upper byte (i.e., the upper 4 bits) is not changed during the fine sweep.

With the multiple passes through the coarse range and the fine range of values for programming signal 328 during the coarse and fine portions of the calibrations, a large range of values may be quickly scanned and still provide fine resolution synchronization of the light pulses 204 emitted from the light source 202 with the pulses of the pixel modulation signal 222 during calibration in accordance with the teachings of the present invention.

In the example, programmable delay circuit 320 is implemented with a plurality of delay stages, including for example delay stage$_1$ 350A through delay stage$_Z$ 350Z, as illustrated in FIG. 3. In one example, a decoder circuit 348 is coupled to receive the N bits of programming signal 328, and control each of the plurality of stages, including delay stage$_1$ 350A through delay stage$_Z$ 350Z, in response to programming signal 328 in accordance with the teachings of the present invention. In one example, delay stage$_1$ 350A is coupled to perform coarser adjustments to the variable delay $t_d$ in response to the pixel programming signal 328, and delay stage$_Z$ 350Z is coupled to perform finer adjustments to the variable delay $t_d$ in response to the pixel programming signal 328 in accordance with the teachings of the present invention. In one example, delay stage$_1$ 350A may provide coarser variable delays $t_d$ on the order of 10 ns, and delay stage$_Z$ 350Z may provide finer variable delays $t_d$ on the order of 0.1 ns. In one example, delay stage$_1$ 350A may be implemented with cascaded flip-circuits or the like, and delay stage$_Z$ 350Z may be implemented with cascaded inverter circuits or the like. In one example, it is appreciated that additional intermediate stage delay circuits not shown in FIG. 3 may also be included, and may be implemented for example with cascaded inverter circuits having capacitive outputs or the like, which may provide variable delays $t_d$ on the order of 1 ns in accordance with the teachings of the present invention.

Figure 4:
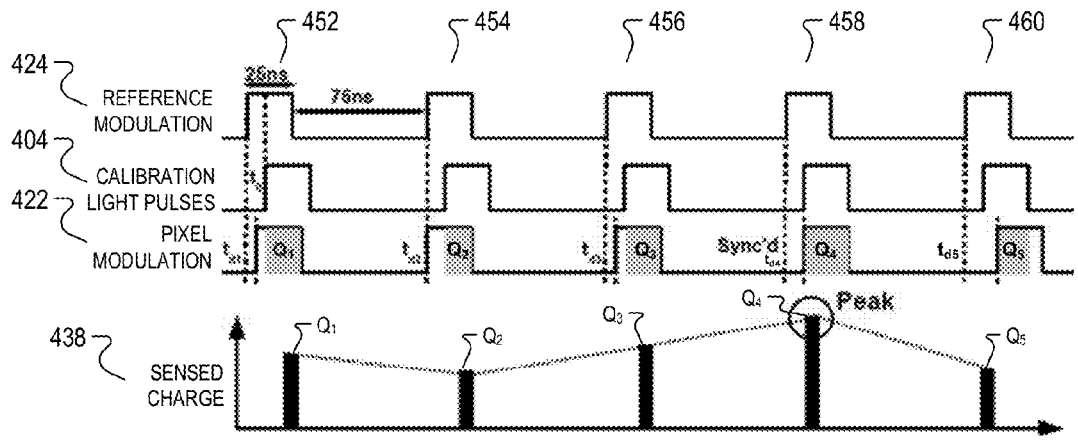
FIG. 4 is a timing diagram that shows an example of a reference modulation signal, calibration light pulses, a pixel modulation signal, and sensed charge during a calibration of a time of flight image sensing system in accordance with the teachings of the present invention.

To illustrate, FIG. 4 is a timing diagram that shows an example of a reference modulation signal 424, light pulses 404 that are emitted during a sweep operation of the calibration of a time of flight image sensing system, a pixel modulation signal 422 with a variable delay $t_d$, and sensed charge 438 during a calibration of a time of flight image sensing system in accordance with the teachings of the present invention. It is appreciated that reference modulation signal 424 of FIG. 4 may be one example of reference modulation signal 224 of FIG. 2 and/or of reference modulation signal 324 of FIG. 3, light pulses 404 may be one example of light pulses 204 of FIG. 2, pixel modulation signal 422 of FIG. 4 may be one example of pixel modulation signal 222 of FIG. 2 and/or of pixel modulation signal 322 of FIG. 3, and that sensed charge 438 may be representative of the pixel information 238 that is read out of the time of flight pixel cell array 212 of FIG. 2, and that similarly named and numbered elements referenced below are therefore coupled and function similar to as described above. It appreciated that the sensed charge 438 that is representative of the pixel information 238 that read out from the time of flight pixel array is representative of an amount of charge Q photogenerated in pixel cells included in the time of flight pixel cell array 212 in response to the reflected light pulses 208 that are sensed by the time of flight pixel cell array 212.

As shown in the depicted example, during a sweep operation of a calibration of a time of flight imaging system, a first pulse 452 occurs at time to at which time pixel modulation signal 422 has a delay of $t_{d1}$, which results in a sensed charge 438 reading of $Q_1$. During a second pulse 454, pixel modulation signal 422 has a delay of $t_{d2}$, which results in a sensed charge 438 reading of $Q_2$. During a third pulse 456, pixel modulation signal 422 has a delay of $t_{d3}$, which results in a sensed charge 438 reading of $Q_3$. During a fourth pulse 458, pixel modulation signal 422 has a delay of $t_{d4}$, which results in a sensed charge 438 reading of $Q_4$. During a fifth pulse 460, pixel modulation signal 422 has a delay of $t_{d5}$, which results in a sensed charge 438 reading of $Q_5$.

As illustrated in the depicted example, the peak charge $Q_4$ is read out during the fourth pulse 458. As a result, the programming signal 228 is calibrated to be equal to the delay setting of the pixel modulation signal 422 at pulse 458, which had a delay of $t_{d4}$ in pixel modulation signal 422. In other words, it is determined that the value of the pixel programming signal 228 during the fourth pulse 458 is the value at which time the calibration light pulses 404 are most synchronized with the pixel modulation signal 422 compared to the other pulses in accordance with the teachings of the present invention. Thus, the value of the pixel programming signal 228 during the fourth pulse 458 is then saved as the result of the calibration operation of the time of flight sensor in accordance with the teachings of the present invention.

Figure 5:
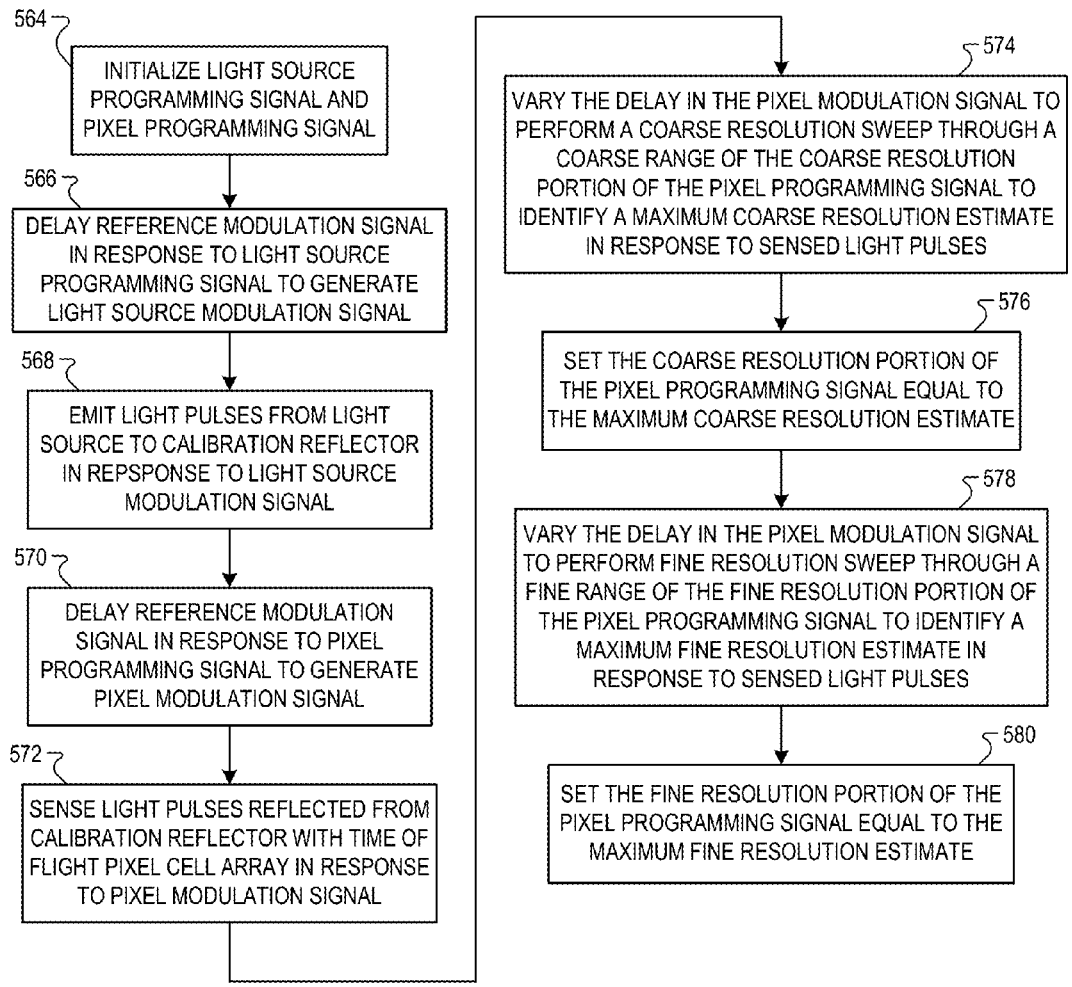
FIG. 5 is a flow chart illustrating one of example of processing performed during a calibration of an example time of flight imaging system in accordance with the teachings of the present invention.

FIG. 5 is a flow chart 562 illustrating one of example of processing performed during a calibration of an example time of flight imaging system in accordance with the teachings of the present invention. Process block 564 shows that the light source programming signal and the pixel programming signal are initialized. In one example, the light source programming signal is initialized to set the delay for the light source modulation signal at an intermediate value. For instance, in an example where the delay of the light source programming signal can be set to a value in the range of 0 ns to 10 ns, the light source programming signal is initialized to be a value of for example 5 ns. In one example, the pixel programming signal is initialized to set the delay for the pixel modulation signal at one end of a range of delays for the pixel programming signal. For instance, in an example where the delay of the pixel programming signal can be set to a value in the range of 0 ns to 10 ns, the pixel programming signal is initialized to a value of for example 0 ns.

Process block 566 shows that the reference modulation signal is delayed in response to the light source programming signal to generate the light source modulation signal. Accordingly, process block 568 shows that light pulses are emitted from the light source in response the light source modulation signal.

Process block 570 shows that the reference modulation signal is also delayed in response to the pixel programming signal to generate the pixel modulation signal. Process block 572 shows that light pulses that are reflected from a calibration reflector are sensed by the time of flight pixel cell array in response to the pixel modulation signal.

Process block 574 shows that the delay in the pixel modulation signal is then varied to perform a coarse resolution sweep through a coarse range of the coarse resolution portion of the pixel programming signal to identify a maximum coarse resolution estimate in response to sensed light pulses. For instance, if the pixel programming signal is an 8-bit digital signal, the most significant byte of the may be varied from binary 0000 to binary 1010 to sweep through the coarse range of the coarse resolution portion of the pixel programming signal. In one example, the time of flight sensor may be sampled multiple times (e.g., 15 times) for each delay setting. Then, each average charge reading for each delay value may be stored and then compared to identify the delay value the resulted in the peak amount of observed charge to find the maximum coarse resolution estimate. In one example, the average charge reading may be determined by reading out and storing charge values for the first and last rows of the time of flight pixel cell array to average out the offset spread across the time of flight pixel cell array. Process block 576 shows that the coarse resolution portion of the pixel programming signal (e.g., the most significant 4 bits) is then set to equal the maximum coarse resolution estimate, which corresponded to the most charge that was sensed by the time of flight pixel cell array in process block 574 during the coarse calibration sweep.

Process block 578 shows that the delay in the pixel modulation signal is then varied to perform a fine resolution sweep through a fine range of the fine resolution portion of the pixel programming signal to identify a maximum fine resolution estimate in response to sensed light pulses. For instance, continuing with the example pixel programming signal that is an 8-bit digital signal, the least significant byte of the may be varied from binary 0000 to binary 1010 to sweep through the fine range of the fine resolution portion of the pixel programming signal. In one example, the time of flight sensor may be sampled multiple times (e.g., 15 times) for each delay setting. Then, each average charge reading for each delay value may be compared to find the maximum fine resolution estimate. In the example, the average charge reading may also be determined by reading out and storing charge values for the first and last rows of the time of flight pixel cell array to average out the offset spread across the time of flight pixel cell array. Process block 580 shows that the fine resolution portion of the pixel programming signal (e.g., the least significant 4 bits) is then set to equal the maximum fine resolution estimate, which corresponded to the most charge was sensed by the time of flight pixel cell array in process block 578 during the fine calibration sweep.

Thus, the coarse and fine resolution portions of the pixel programming signal are calibrated to values at which the most charge was observed during the coarse and fine calibration sweeps in accordance with the teachings of the present invention. With the pixel programming signal now synchronized with the light source modulation signal, the time of flight imaging system now enjoys improved efficiency as well as high depth resolution of sensed objects in accordance with the teachings of the present invention.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A time of flight imaging system, comprising:
a light source coupled to emit light pulses to an object in response to respective pulses of a light source modulation signal, wherein the light source modulation signal is generated in response to a reference modulation signal;
a time of flight pixel cell array including a plurality of pixel cells, wherein each one of the plurality of pixel cells is coupled to sense reflected light pulses reflected back from the object in response to respective pulses of a pixel modulation signal;
a programmable pixel delay line circuit coupled to generate the pixel modulation signal in response to the reference modulation signal, wherein the pixel modulation signal is coupled to have a variable pixel delay programmed in response to a pixel programming signal; and
a control circuit coupled to receive pixel information from the time of flight pixel array representative of the reflected light pulses sensed by the time of flight pixel array, wherein the control circuit is coupled to vary the pixel programming signal during a calibration mode in response to pixel information received from the time of flight pixel array to synchronize the light pulses emitted from the light source with the pulses of the pixel modulation signal, wherein the pixel programming signal is an n bit signal, wherein most significant bits of the n bit signal are varied during a first portion of the calibration mode, and wherein least significant bits of the n bit signal are varied during a second portion of the calibration mode.

2. The time of flight imaging system of claim 1 further comprising a programmable light source delay line circuit coupled to generate the light source modulation signal in response to the reference modulation signal, wherein the light source modulation signal is coupled to have variable light source delay programmed in response to a light source programming signal.

3. The time of flight imaging system of claim 2 wherein the control circuit is coupled to set the light source programming signal.

4. The time of flight imaging system of claim 1 wherein variations to the most significant bits of the n bit signal are coupled to perform coarse adjustments to the pixel programming signal, and wherein variations to the least significant bits of the n bit signal are coupled to perform fine adjustments to the pixel programming signal.

5. The time of flight imaging system of claim 1 wherein the programmable pixel delay line circuit includes a plurality of stages, wherein a first one of the plurality of stages is coupled to perform coarse adjustments to the variable pixel delay in response to the pixel programming signal, and wherein a second one of the plurality of stages is coupled to perform fine adjustments to the variable pixel delay in response to the pixel programming signal.

6. The time of flight imaging system of claim 1 wherein the pixel information read out from the time of flight pixel array is representative of an amount of charge photogenerated in response to the reflected light pulses that are sensed by the time of flight pixel array.

7. The time of flight imaging system of claim 1 further comprising read out circuitry coupled to the time of flight pixel cell array to read out pixel information from the pixel cells of the time of flight pixel cell array.

8. The time of flight imaging system of claim 1 wherein the object is a calibration reflector positioned in front of the light source and the sensor to reflect the light pulses emitted from the light source back to the time of flight pixel cell array during the calibration mode.

9. The time of flight imaging system of claim 1 further comprising a light source driver circuit coupled to drive the light source in response to pulses of the light source modulation signal.

10. The time of flight imaging system of claim 1 further comprising pixel control circuitry coupled to generate control signals coupled to control the time of flight pixel cell array to sense the reflected light pulses in response to pulses of the pixel modulation signal.

11. A method of calibrating a time of flight imaging system, comprising:
    initializing a pixel programming signal having N bits to an initial value, wherein the pixel programming signal includes a coarse resolution portion and a fine resolution portion;
    emitting light pulses from a light source to an object in response to a reference modulation signal;
    delaying the reference modulation signal in response to the pixel programming signal to generate a pixel modulation signal;
    sensing the light pulses reflected from the object with a time of flight pixel cell array in response to the pixel modulation signal;
    performing a coarse resolution sweep through a coarse range of the coarse resolution portion of the pixel programming signal to identify a maximum coarse resolution estimate for the coarse resolution portion of the pixel programming signal in response to the light pulses sensed with the time of flight pixel cell array;
    setting the coarse resolution portion of the pixel programming signal to equal to the maximum coarse resolution estimate;
    performing a fine resolution sweep through a fine range of the fine resolution portion of the pixel programming signal to identify a maximum fine resolution estimate for the fine resolution portion of the pixel programming signal in response to the light pulses sensed with the time of flight pixel cell array; and
    setting the fine resolution portion of the pixel programming signal to equal to the maximum fine resolution estimate.

12. The method of claim 11 further comprising delaying the reference modulation signal in response to a light source programming signal to generate a light source modulation signal, wherein the light pulses are emitted to the object in response to the light source modulation signal.

13. The method of claim 12 further comprising initializing the light source programming signal to an initial value, wherein the light source programming signal has N bits and includes a coarse resolution portion and a fine resolution portion.

14. The method of claim 11 wherein sensing the light pulses reflected from the object with the time of flight pixel cell array in response to the pixel modulation signal comprises:
    reading out pixel information from a first edge and from a second edge of the time of flight pixel cell array representative of the reflected light pulses sensed at the first edge and the second edge, respectively, of the time of flight pixel cell array; and
    averaging the pixel information read out from the first and second edges of the time of flight pixel cell array.

15. The method of claim 14 wherein the time of flight pixel cell array is arranged into a plurality of rows and columns of pixel cells, wherein the first edge and the second edge of the time of flight pixel cell array include a first row and a last row of the time of flight pixel cell array.

16. The method of claim 14 wherein said sensing the light pulses reflected from the object with the time of flight pixel cell array comprises sensing a plurality of light pulses reflected from the object with the time of flight pixel cell array prior to each read out of pixel information from the first edge and the second edge of the time of flight pixel cell array.

17. The method of claim 11 wherein the coarse resolution portion of the programming signal includes most significant bits of the pixel programming signal, and wherein the fine resolution portion of the programming signal includes least significant bits of the pixel programming signal.

18. The method of claim 17 wherein said performing the coarse resolution sweep through the coarse range of the coarse resolution portion of the pixel programming signal comprises incrementing the most significant bits from a minimum value of the coarse range to a maximum value of the coarse range.

19. The method of claim 17 wherein said performing the fine resolution sweep through the fine range of the fine resolution portion of the pixel programming signal comprises incrementing the least significant bits from a minimum value of the fine range to a maximum value of the fine range.

20. The method of claim 11 further comprising positioning a calibration reflector in front of the light source to reflect the light pulses from the light source to the time of flight pixel cell array during a calibration of the time of flight imaging system.

* * * * *